United States Patent
Lin et al.

(10) Patent No.: US 11,129,412 B2
(45) Date of Patent: Sep. 28, 2021

(54) BATTERY STICK FOR OVAL-SHAPED ELECTRONIC CIGARETTE

(71) Applicant: Guangrong Lin, Guangdong (CN)

(72) Inventors: Guangrong Lin, Guangdong (CN); Xianbin Zheng, Guangdong (CN)

(73) Assignee: Guangrong Lin, Shenzhen (CN)

( * ) Notice: Subject to any disclaimer, the term of this patent is extended or adjusted under 35 U.S.C. 154(b) by 276 days.

(21) Appl. No.: 16/341,456

(22) PCT Filed: Sep. 8, 2017

(86) PCT No.: PCT/CN2017/101103
§ 371 (c)(1),
(2) Date: Apr. 12, 2019

(87) PCT Pub. No.: WO2018/068602
PCT Pub. Date: Apr. 19, 2018

(65) Prior Publication Data
US 2019/0261690 A1    Aug. 29, 2019

(30) Foreign Application Priority Data
Oct. 14, 2016    (CN) .......................... 201610900334.3

(51) Int. Cl.
*A24F 40/40*    (2020.01)
*H02J 7/00*    (2006.01)
(Continued)

(52) U.S. Cl.
CPC .......... *A24F 40/40* (2020.01); *H01M 10/425* (2013.01); *H01M 50/213* (2021.01); *H02J 7/00* (2013.01);
(Continued)

(58) Field of Classification Search
CPC .......................... H01M 50/213; H01M 10/425
See application file for complete search history.

(56) References Cited

U.S. PATENT DOCUMENTS 9,526,273  B2 *  12/2016  Liu .......................... A24F 40/50
2015/0357608  A1 *  12/2015  Huang ................ H01M 50/172
131/329

FOREIGN PATENT DOCUMENTS

CN    203353689 U    12/2013
CN    103682203 A  *  3/2014
(Continued)

OTHER PUBLICATIONS

International Search Report of PCT Patent Application No. PCT/CN2017/101103 dated Dec. 13, 2017.

*Primary Examiner* — Maria Laios
*Assistant Examiner* — Jordan E Berresford

(57) ABSTRACT

A battery stick for the oval-shaped electronic cigarette comprises a rod shaped housing, and a battery, a control circuit board, and a power button which are accommodated in the housing, wherein an engagement portion for fixed connection with a vaporizer is arranged on an inner wall of the housing proximal to the open end, a mounting frame fitted inside the housing comprises a battery section and a circuit section arranged at one side of the control circuit board with a frame side plate having a same curvature as the inner wall of the housing, an outer border of the mounting frame is arranged with electrodes; the power button is arranged on the power switch of the control circuit board and is received in the first button hole of the housing; and a wedge part is arranged between the inner wall of the housing and the frame side plate.

7 Claims, 6 Drawing Sheets

(51) Int. Cl.
*H01M 50/213* (2021.01)
*A24F 40/50* (2020.01)
*A24F 40/60* (2020.01)
*H01M 10/42* (2006.01)

(52) U.S. Cl.
CPC .............. *A24F 40/50* (2020.01); *A24F 40/60* (2020.01); *H01M 2010/4271* (2013.01); *H01M 2220/30* (2013.01)

(56) References Cited

FOREIGN PATENT DOCUMENTS

| | | | |
|---|---|---|---|
| CN | 203555163 U | * | 4/2014 |
| CN | 203555163 U | | 4/2014 |
| CN | 206165814 U | | 5/2017 |

* cited by examiner

BATTERY STICK FOR OVAL-SHAPED ELECTRONIC CIGARETTE

FIELD OF THE INVENTION

The present invention relates to the technical field of electronic cigarettes, more particularly to a battery stick for an oval-shaped electronic cigarette.

BACKGROUND OF THE INVENTION

Compared with regular cigarettes, the e-cigarette liquid of electronic cigarettes does not contain tobacco tar which is harmful to the human body, and thus the electronic cigarettes are widely used and gradually replace the tobacco cigarettes. Existing electronic cigarettes usually comprise a vaporizer and a battery stick, wherein the vaporizer is arranged with a liquid storage chamber for storing the e-cigarette liquid, and a vaporizing chamber, in which a heating unit for absorbing the e-cigarette liquid stored in the liquid storage chamber and heating and vaporizing it into vapor for the users is arranged, wherein the battery stick is arranged with components such as a battery and a control circuit board, so as to supply power for the heating unit of the vaporizer.

Due to the oval shape, existing battery sticks for the oval-shaped electronic cigarette usually have a small, long and narrow inner space which makes it difficult to arrange various components. They usually have a complicated connection relationship with the vaporizer, a complicated inner structure, and a complicated assembly process as well. The existing battery sticks for the oval-shaped electronic cigarette are unstable during using and have high cost during manufacturing.

SUMMARY OF THE INVENTION

Technical Problems

To solve the above problems, the present invention aims to provide a battery stick for an oval-shaped electronic cigarette, which has a simple and stable internal structure, realizes a simple and fast connection, allows for ease of manufacture and assembly, and reduces labor and material costs.

Technical Solutions

To this end, the present invention provides a technical solution as follow. A battery stick for the oval-shaped electronic cigarette comprises a rod shaped housing with oval-shaped cross section, and a battery, a control circuit board, and a power button which are accommodated in the housing, wherein the housing has an open end and a closed end, an engagement portion for fixed connection to a vaporizer is arranged on an inner wall of housing proximal to the open end, the housing is provided with a first button hole from which the power button can protrude, and a mounting frame is fitted inside the housing, wherein the mounting frame comprises a circuit section for mounting the control circuit board and a battery section for mounting the battery, the circuit section of the mounting frame being arranged at one side of the control circuit board with a frame side plate having a same curvature as the inner wall of the housing, an outer border of the mounting frame proximal to the open end of the housing is provided with positive and negative electrodes;

The control circuit board is arranged with a press-type power switch, the power button is arranged on the power switch and is received in the first button hole; a wedge part for securing the mounting frame is arranged between the inner wall of the housing and the frame side plate, and the wedge part is sized to be inserted via the open end of the housing.

Preferably, an oval-shaped end panel may be arranged vertically at the wedge part, on the side proximal to the open end of the housing, wherein the end panel has a same cross section as the inner wall of the housing, the end panel is further provided with two electrode through holes, through which the positive and negative electrodes can pass, and the end panel tightly abuts against the outer border of the mounting frame.

Preferably, a snap fit structure may be provided between the frame side plate and the wedge part, to enable a fixed connection there-between.

Preferably, the snap fit structure may comprise a rectangle opening provided on the frame side plate, a tongue extending obliquely from the rectangle opening, and a snap-in hole which is provided on the wedge part and can be engaged with the tongue.

Preferably, the mounting frame may comprise four rectangle borders, in which two long borders are located at an outer wall of the battery section, have the same curvature as the inner wall of the housing and abut tightly against the inner wall of the housing, and two short borders, including an outer border and an inner border, are oval-shaped flat plates disposed at two inner ends of the housing, and a baffle plate having a cut-out is arranged between the circuit section and the battery section.

Preferably, two sides of the control circuit board may be retained and mounted on the long borders of the circuit section of the mounting frame, and other two sides of the control circuit board are stuck and mounted between the baffle plate and the outer border.

Preferably, the circuit section of the mounting frame may be arranged with a detachable cover plate having the same curvature as the inner wall of the housing at another side of the control circuit board, wherein the cover plate is provided with a second button hole from which the power button can protrude, wherein a protruding ring protruding upwards is arranged at a circumferential edge of the second button hole, and the protruding ring is mounted in the first button hole, wherein the power button is arranged at its bottom with a shoulder for preventing the power button from falling out from the second button hole.

Preferably, the engagement portion may comprise a male snap or a groove for connection with an outer wall of a connecting end of a vaporizer, and the male snap or the groove is arranged on the inner wall of the housing.

Preferably, the closed end of the housing may be provided with an USB through hole through which an USB charging connector can pass, the inner border of the mounting frame proximal to the closed end of the housing is arranged with an interface circuit board, and the interface circuit board is arranged with an USB charging interface to which the USB charging connector can be plugged.

Preferably, the positive and negative electrodes may be elastic and stretchable electrodes.

Technical Advantages

The present invention, which provides an oval-shaped, long and narrow inner space, has a simple and compact internal structure, stable and reliable connection, realizes a simple and fast assembly, and greatly reduces labor costs during manufacturing. It also facilitates a simple and reliable connection with the vaporizer. It does not need metal joint structure and thus saves materials.

Figure 1:
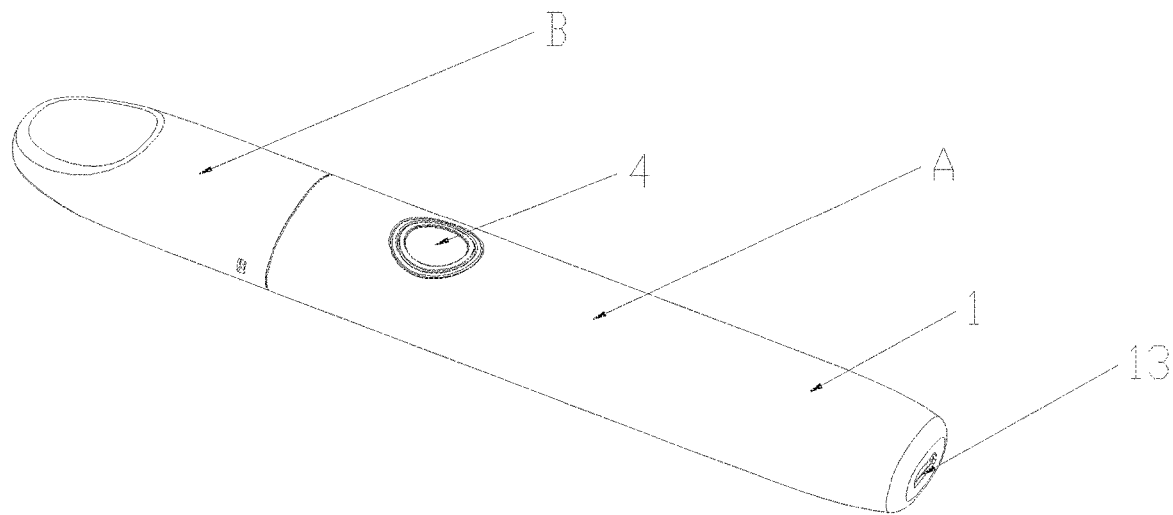
FIG. 1 is a perspective view illustrating a battery stick according to an embodiment of the present invention being connected with a vaporizer.

Herein, reference numerals of main components are as follows.

A. battery stick; B. vaporizer; 1. housing; 11. first button hole; 12. engagement portion; 13. USB through hole; 2. battery; 3. control circuit board; 31. power switch; 4. power button; 41. shoulder; 5. mounting frame; 51. circuit section; 52. battery section; 53. frame side plate; 54. long border; 551. outer border; 552. inner border; 553. hook; 56. baffle plate; 6. positive and negative electrodes; 60. electrode mounting holes; 7. wedge part; 70. snap fit structure; 701. rectangle opening; 702. tongue; 703. snap-in hole; 71. end panel; 710. electrode through holes; 8. cover plate; 81. second button hole; 82. protruding ring; 9. interface circuit board; 91. USB charging interface.

DETAILED DESCRIPTION OF ILLUSTRATED EMBODIMENTS

In order to make purposes, technical solutions and advantages of the present invention clearer, the present invention will be further explained in detail with reference to figures and embodiments described hereinafter.

Referring to FIG. 1, a battery stick A for an oval-shaped electronic cigarette of the present invention can be connected with a vaporizer B of the electronic cigarette to constitute the electronic cigarette, and it serves to supply power for the vaporizer B of the electronic cigarette.

Figure 2:
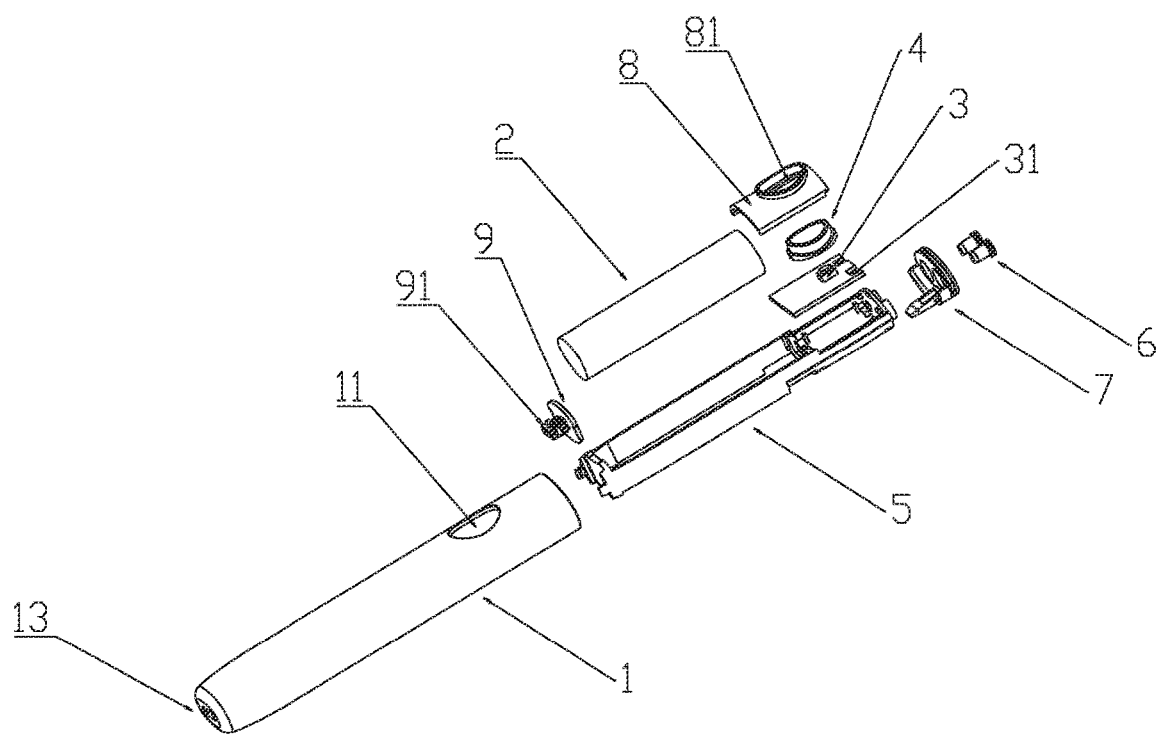
FIG. 2 is an exploded view of a battery stick according to an embodiment of the present invention.

Referring to FIG. 2, the battery stick comprises a rod shaped housing 1 with oval-shaped cross section, a battery 2 accommodated in the housing 1, a control circuit board 3, and a power button 4, wherein the housing 1 has an open end and a closed end, such that the battery 2, the control circuit board 3 and the power button 4 can be loaded into the housing 1 via the open end of the housing 1, wherein a flat side wall of the housing 1 adjacent to the open end is provided with a first button hole 11 from which the power button 4 can protrude, an engagement portion 12 for fixed connection to the vaporizer B is arranged on an inner wall of the open end of housing 1.

Referring to FIGS. 1-7, a mounting frame 5 is fitted inside the housing 1, wherein the mounting frame 5 comprises two sections, one of which is a circuit section 51 for fixedly mounting the control circuit board 3 and the other is a battery section 52 for fixedly mounting the battery 2. The circuit section 51 of the mounting frame 5 is arranged with a frame side plate 53 having the same curvature as the inner wall of the housing 1 at one side of the control circuit board 3. Since the frame side plate 53 has the same curvature as the inner wall of the housing 1, the mounting frame 5 can be fixedly arranged to abut against the inner wall of the housing 1 and prevented from loosing. A border of the mounting frame 5 proximal to the open end of the housing 1 is provided with two electrode mounting holes 60, and positive and negative electrodes 6 are disposed in the electrode mounting hole 60. The positive and negative electrodes 6 can be in contact with positive and negative electrodes (not shown in the drawings) of the vaporizer B, so as to allow the battery stick A to supply power for the vaporizer B.

Referring to FIGS. 2-7, in an embodiment of the present invention, the mounting frame 5 comprises four rectangle borders, in which two long borders 54 are located at an outer wall of the battery section 52, have the same curvature as the inner wall of the housing 1 and abut tightly against the inner wall of the housing 1, and two short borders, including an outer border 551 and an inner border 552, are oval-shaped flat plates. A baffle plate 56 having a cut-out is arranged between the circuit section 51 and the battery section 52. The baffle plate 56 serves to retain the control circuit board 3 and fix the battery 2, and a wire connecting the battery with the circuit board can pass through the cut-out of the baffle plate 56.

Figure 8:
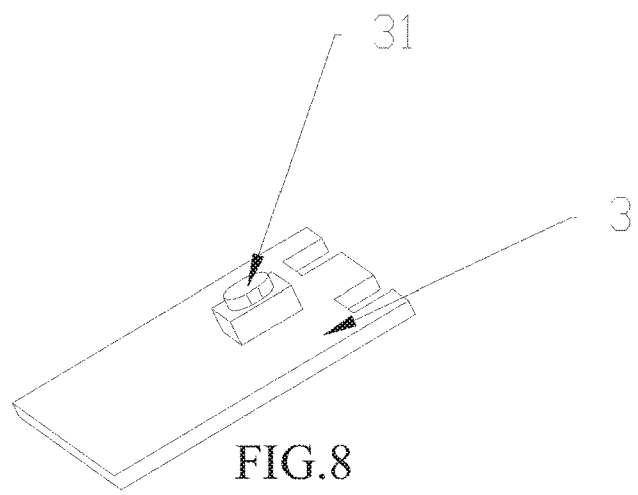
FIG. 8 is a perspective view of a control circuit board according to an embodiment of the present invention.

Referring to FIGS. 2 and 8, the control circuit board 3 can be configured to control the power supplied by means of the battery 2 of the battery stick and adjust the supply voltage and the supply current to facilitate stable operation. The control circuit board 3 is arranged with a press-type power switch 31. The power button 4 is arranged on the power switch 31 and is received in the first button hole 11. The user can press the power button 4 to perform an operation of the power switch 31.

Figure 10:
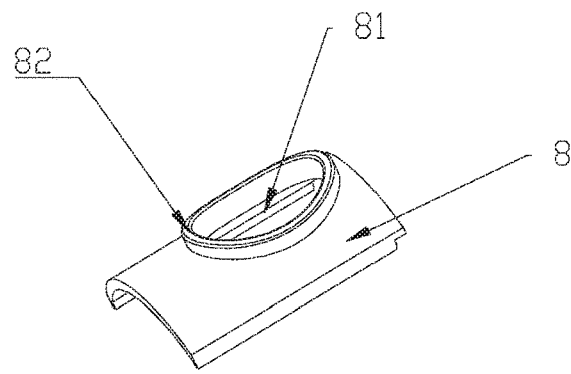
FIG. 10 is a perspective view of a cover plate according to an embodiment of the present invention.
Figure 11:
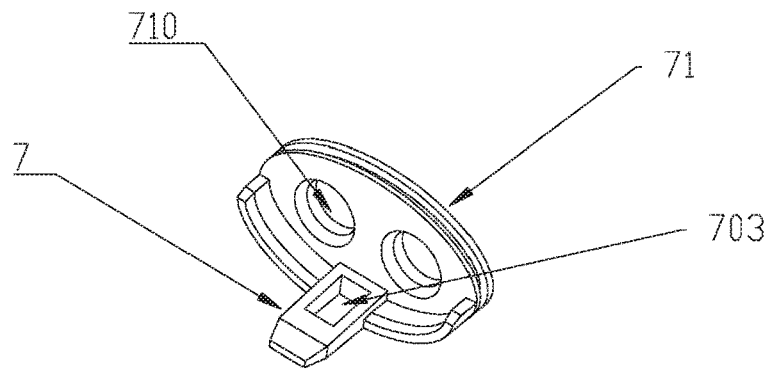
FIG. 11 is a perspective view of a wedge part according to an embodiment of the present invention.
Figure 12:
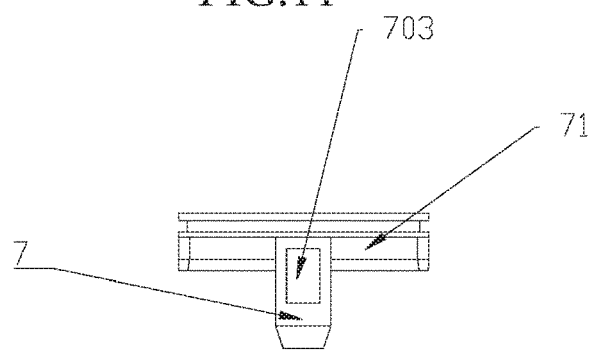
FIG. 12 is a top view of a wedge part according to an embodiment of the present invention.
Figure 13:
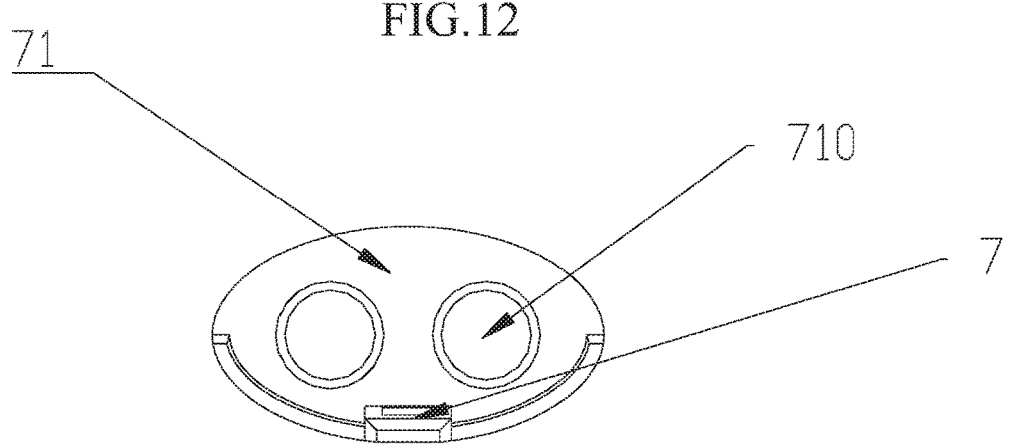
FIG. 13 is a front view of a wedge part according to an embodiment of the present invention.
Figure 14:
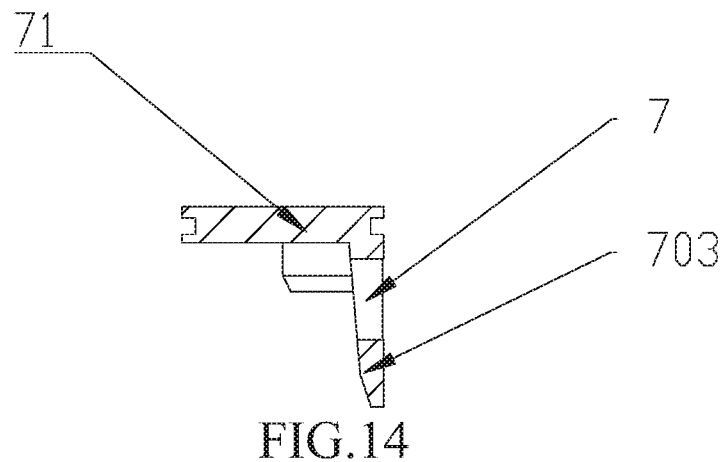
FIG. 14 is a sectional side view of a wedge part according to an embodiment of the present invention.
Figure 15:
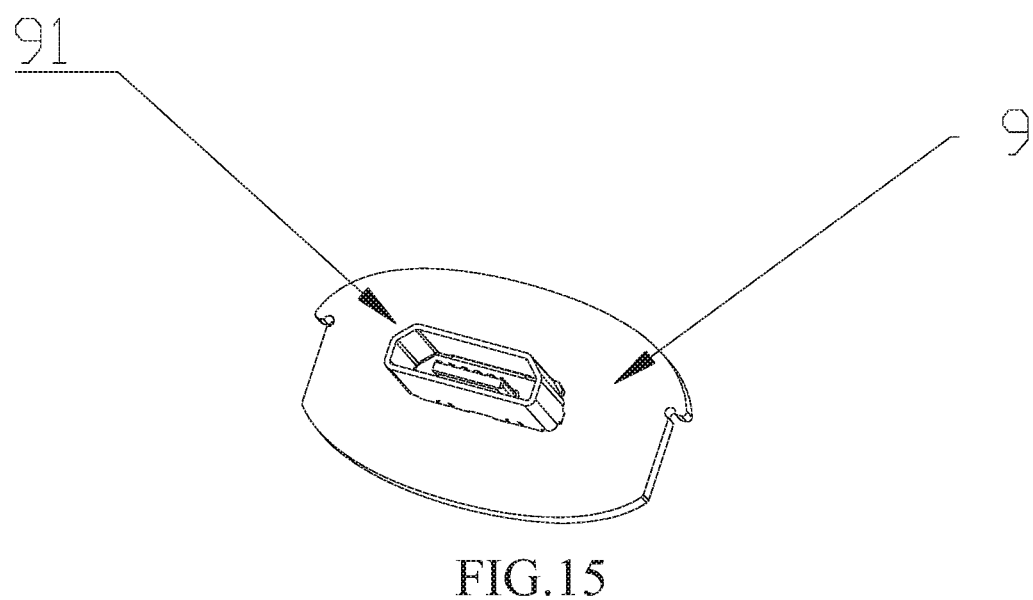
FIG. 15 is one perspective view illustrating an USB charging interface and an interface circuit board according to an embodiment of the present invention.
Figure 16:
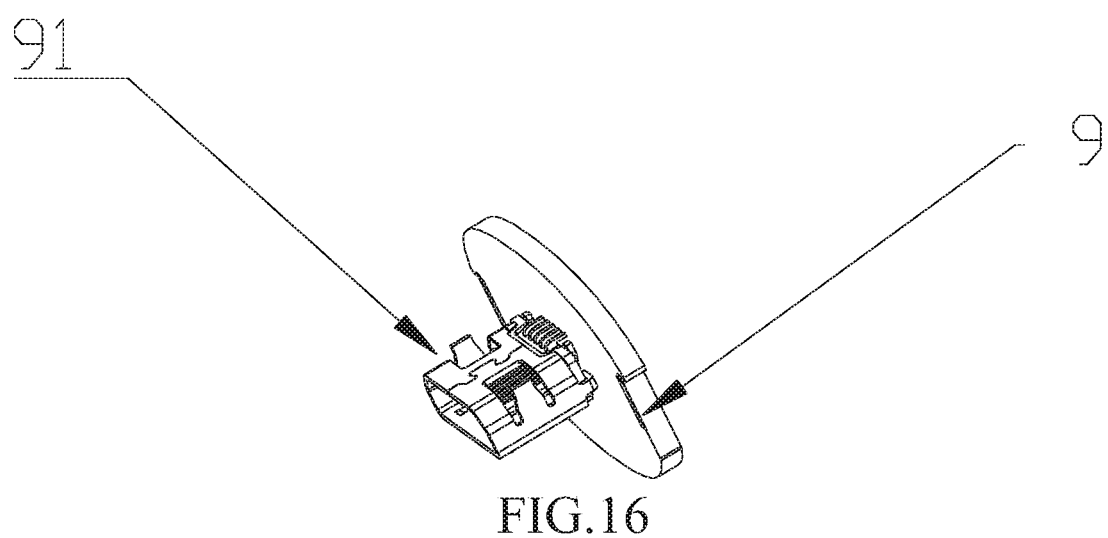
FIG. 16 is another perspective view illustrating an USB charging interface and an interface circuit board according to an embodiment of the present invention.

Referring to FIGS. 2 and 10, in an embodiment of the present invention, the circuit section 51 of the mounting frame 5 is arranged with a cover plate 8 having the same curvature as the inner wall of the housing 1 at another side of the control circuit board 3. Since the cover plate 8 has the same curvature as the inner wall of the housing 1, the cover plate 8 can abut tightly against the inner wall of the housing 1 and is prevented from loosing. The cover plate 8 is detachable, i.e., it is a type of removable cover plate. The cover plate 8 is provided with a second button hole 81 from which the power button 4 can protrude. A protruding ring 82 protruding upwards is arranged at a circumferential edge of the second button hole 81. The protruding ring 82 can be mounted in the first button hole 11, so as to fixedly mount the cover plate 8, and retain the power button 4 and prevent the power button 4 from loosing.

Figure 9:
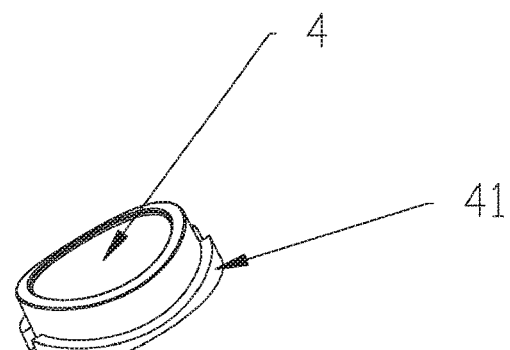
FIG. 9 is a perspective view of a button according to an embodiment of the present invention.

Referring to FIGS. 2 and 9, in the present embodiment, the power button 4 is arranged on the power switch 31, and the cover plate 8 covers the control circuit board 3, with the power button 4 protruding from the second button hole 81. The power button 4 is arranged with a shoulder 41 at its bottom, and the shoulder 41 has an outer diameter greater than the diameter of the second button hole 81. Hence, the power button 4 can be retained inside the cover plate by the shoulder 41 and can be prevented from falling out from the second button hole 81.

Referring to FIGS. 2 and 11-14, in an embodiment of the present invention, a wedge part 7 is arranged between the inner wall of the housing 1 and the frame side plate 53, and the wedge part 7 can be inserted via the open end of the housing 1. In the case that the wedge part 7 is inserted in place, it tightly presses the mounting frame 5 and the cover plate 8 against the inner wall of the housing 1, so as to secure the mounting frame 5 and the cover plate 8 and prevent the mounting frame 5 from loosing. An oval-shaped end panel 71 is arranged vertically at the wedge part 7, on the side proximal to the open end of the housing 1. The end panel 71 has a same cross section as the inner wall of the housing 1, such that the end panel 71 is retained by the inner wall of the housing 1 and its lateral movement is suppressed, and the mounting frame 5 is further secured. The end panel 71 is further provided with two electrode through holes 710, through which the positive and negative electrodes 6 can pass exactly. In the case that the wedge part 7 is inserted between the inner wall of the housing 1 and the frame side plate 53 in place, the end panel 71 abuts tightly against the outer border 551 of the mounting frame 5. Due to the wedge part 7, the present invention has simple assembly and reliable and firm connection.

Referring to FIGS. 2-7 and 11-14, in an embodiment of the present invention, a snap fit structure 70 is provided between the frame side plate 53 and the wedge part 7, to enable a fixed connection there-between. In particular, the snap fit structure 70 may comprise a rectangle opening 701 provided on the frame side plate 53, a tongue 702 extending obliquely from the rectangle opening 701, and a snap-in hole 703 which is provided on the wedge part 7 and can be engaged with the tongue 702. In other embodiments, the snap fit structure 70 may also be structures such as a structure of male snap and male snap, or a structure of male snap and snap-in hole.

Figure 3:
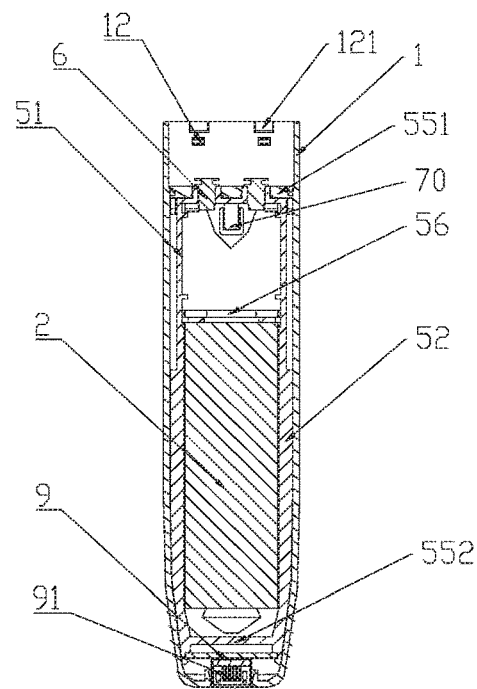
FIG. 3 is a front sectional view of a battery stick according to an embodiment of the present invention.
Figure 4:
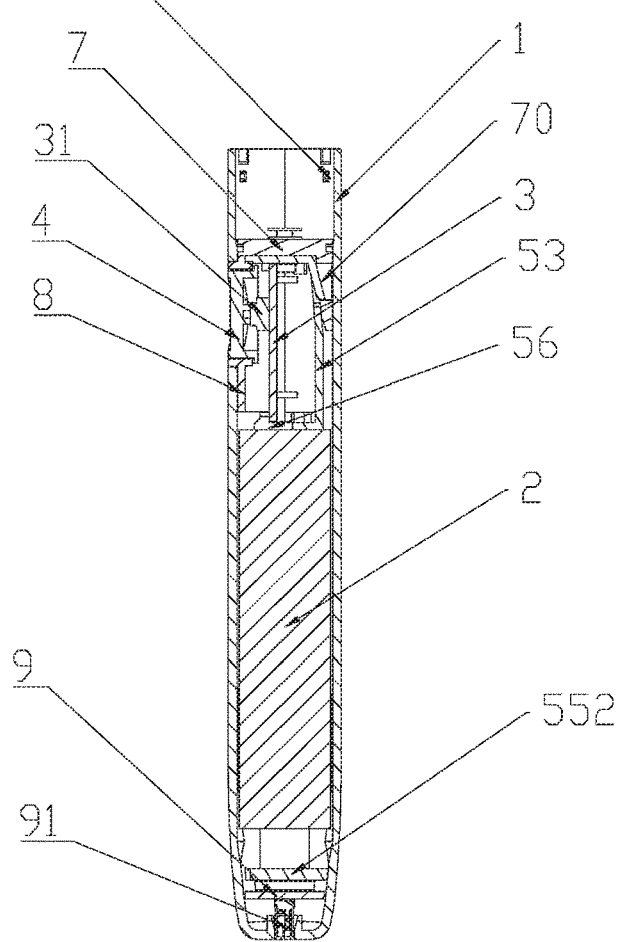
FIG. 4 is a sectional side view of a battery stick according to an embodiment of the present invention.
Figure 5:
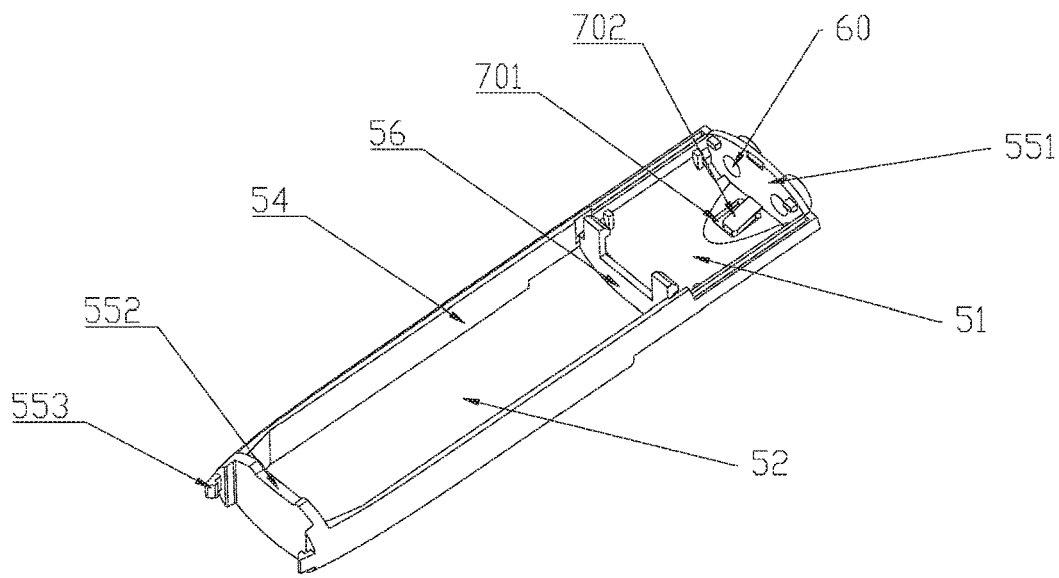
FIG. 5 is a perspective view of a mounting frame according to an embodiment of the present invention.
Figure 6:
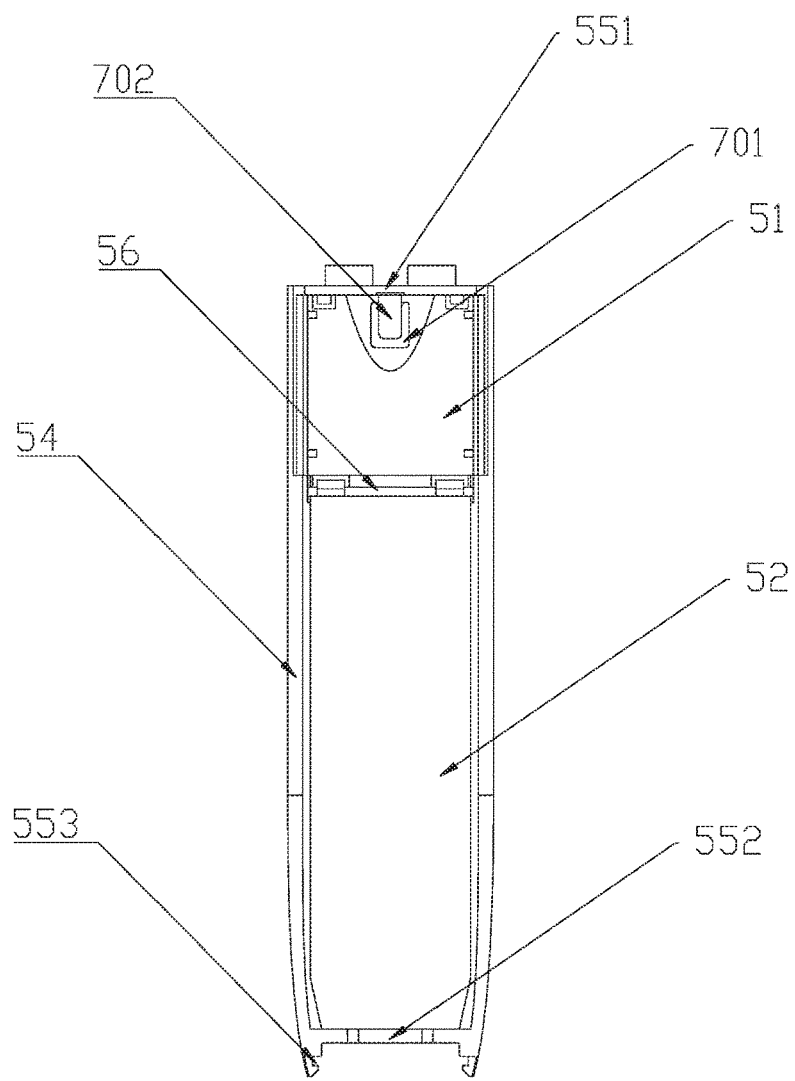
FIG. 6 is a front view of a mounting frame according to an embodiment of the present invention.
Figure 7:
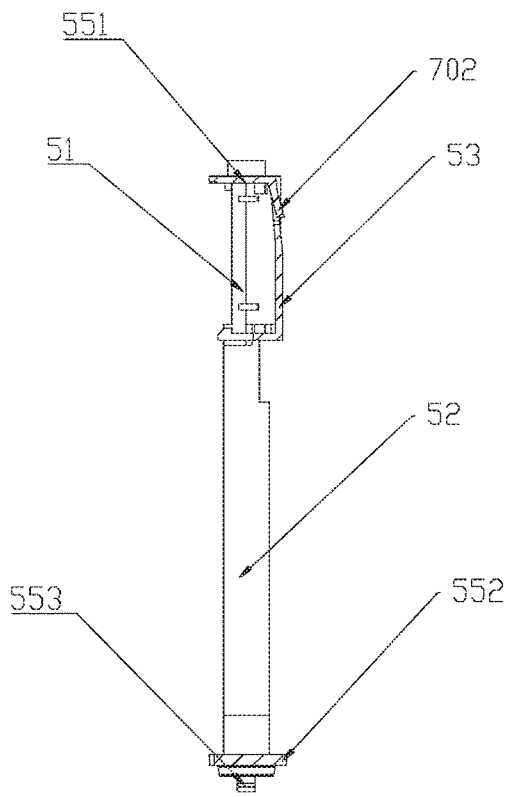
FIG. 7 is a side view of a mounting frame according to an embodiment of the present invention.

Referring to FIGS. 3 and 4, in an embodiment of the present invention, the engagement portion 12 may be a groove which is arranged on the inner wall of the housing 1 and can be connected with the outer wall of the connecting end of the vaporizer. For this purpose, the vaporizer B may be correspondingly arranged with a male snap which can be snap-fitted to the groove. In order to facilitate convenient snap-fitting of the male snap of the vaporizer B into the groove, a sliding groove 121 formed at an angle is further correspondingly arranged on the inner wall of the open end of housing 1 and is located outside the groove. In other embodiments, the engagement portion 12 may also be a male snap, or other structure. The engagement portion 12 of the present invention has a simple and stable structure. It does not need metal screw joint structure which is usually required for the connection between the battery stick of conventional electronic cigarettes and the vaporizer and thus saves lots of metal materials.

Referring to FIGS. 1-7 and 15-16, in an embodiment of the present invention, the closed end of the housing 1 is provided with an USB through hole 13 through which an USB charging connector (not shown in the drawings) can pass. The inner border 552 of the mounting frame 5 proximal to the closed end of the housing 1 is arranged with an interface circuit board 9. The interface circuit board 9 is arranged with an USB charging interface 91 to which the USB charging connector can be plugged. In the present embodiment, the USB charging interface 91 is a Micro-USB charging interface.

In the present embodiment, the inner border 552 is arranged with a hook 553, and the interface circuit board 9 can be secured to the inner border 552 by the hook 553.

Referring to FIG. 2, the positive and negative electrodes 6 in the present invention may be elastic and stretchable electrodes. When the battery stick A is connected with the vaporizer B, the positive and negative electrodes 6 which are elastic and stretchable can be in close contact with positive and negative electrodes (not shown in the drawings) of the vaporizer B so as to supply power.

As described above, with the mounting frame 5 in the present invention, the battery 2, the circuit board 3, the power button 4, the positive and negative electrodes 6 and the cover plate 8 can be mounted on the mounting frame 5, and then the mounting frame 5 can be disposed in the housing 1. After that, the wedge part 7 can be inserted between the inner wall of the housing 1 and the mounting frame 5 to realize a fixed mounting. It realizes a simple and fast connection and greatly reduces labor costs during manufacturing.

Though the battery stick and some internal components according to the present invention as described above have oval-shaped contours, other shapes may be provided in other embodiments without changing its internal structure.

INDUSTRIAL APPLICABILITY

All the above are merely preferred embodiments of the present invention, which are not intended to limit the present invention in any form. The present invention is intended to cover all changes, various modifications and equivalent arrangements those skilled in the art can make according to the technical essence of the present invention.

The invention claimed is:

1. A battery stick for the oval-shaped electronic cigarette, which can be connected with a vaporizer of the electronic cigarette to constitute the electronic cigarette and serves to supply power for the vaporizer of the electronic cigarette, comprising a rod shaped housing with oval-shaped cross section, and a battery, a control circuit board, and a power button which are accommodated in the housing, the housing has an open end and a closed end, an engagement portion for fixed connection with the vaporizer is arranged on an inner wall of the housing proximal to the open end, the housing is provided with a first button hole from which the power button can protrude, and a mounting frame is fitted inside the housing, wherein the mounting frame comprises a circuit section for mounting the control circuit board and a battery section for mounting the battery, the circuit section of the mounting frame being arranged at one side of the control circuit board with a frame side plate having a same curvature as the inner wall of the housing, an outer border of the mounting frame proximal to the open end of the housing is arranged with positive and negative electrodes; the control circuit board is arranged with a press-type power switch, the power button is arranged on the press-type power switch and is received in the first button hole; and a wedge part sized to be inserted via the open end of the housing is arranged between the inner wall of the housing and the frame side plate to secure the mounting frame;

an oval-shaped end panel is arranged vertically at the wedge part on the side proximal to the open end of the housing, wherein the oval-shaped end panel has a same cross section as the inner wall of the housing, the oval-shaped end panel is further provided with two electrode through holes, through which the positive and negative electrodes can pass, and the oval-shaped end panel tightly abuts against the outer border of the mounting frame;

a snap fit structure is provided between the frame side plate and the wedge part to enable a fixed connection there-between;

characterized in that, the snap fit structure comprises a rectangle opening provided on the frame side plate, a tongue extending obliquely from the rectangle opening, and a snap-in hole which is provided on the wedge part and can be engaged with the tongue.

2. The battery stick for the oval-shaped electronic cigarette according to claim 1, characterized in that, the mounting frame comprises four rectangle borders, in which two long borders are located at an outer wall of the battery section and are formed with a curvature such that the two long borders can abut tightly against the inner wall of the housing, and two short borders, including an outer border and an inner border, are oval-shaped flat plates disposed at two inner ends of the housing, and a baffle plate having a cut-out is arranged between the circuit section and the battery section.

3. The battery stick for the oval-shaped electronic cigarette according to claim 2, characterized in that, two sides of the control circuit board are retained and mounted on the long borders of the circuit section of the mounting frame, and other two sides of the control circuit board are stuck and mounted between the baffle plate and the outer border.

4. The battery stick for the oval-shaped electronic cigarette according to claim 1, characterized in that, the circuit section of the mounting frame is arranged at another side of the control circuit board with a detachable cover plate having the same curvature as the inner wall of the housing, wherein the cover plate is provided with a second button hole from which the power button can protrude, wherein a protruding ring protruding upwards is arranged at a circumferential edge of the second button hole, and the protruding ring is mounted in the first button hole, wherein the power button is arranged at its bottom with a shoulder for preventing the power button from falling out from the second button hole.

5. The battery stick for the oval-shaped electronic cigarette according to claim 1, characterized in that, the engagement portion comprises a male snap or a groove for connection with an outer wall of a connecting end of the vaporizer, and the male snap or the groove is arranged on the inner wall of the housing.

6. The battery stick for the oval-shaped electronic cigarette according to claim 1, characterized in that, the closed end of the housing is provided with an USB through hole through which an USB charging connector can pass, the inner border of the mounting frame proximal to the closed end of the housing is arranged with an interface circuit board, and the interface circuit board is arranged with an USB charging interface to which the USB charging connector can be plugged.

7. The battery stick for the oval-shaped electronic cigarette according to claim 1, characterized in that, the positive and negative electrodes are elastic and stretchable electrodes.

* * * * *